United States Patent
Lee et al.

(10) Patent No.: US 6,501,573 B1
(45) Date of Patent: Dec. 31, 2002

(54) APPARATUS AND METHOD FOR MONITORING THE QUALITIES OF OPTICAL SIGNAL USING CLOCK AMPLITUDE

(75) Inventors: Chang Hee Lee, Taejun (KR); Yun Chur Chung, Teajun (KR); Sang Young Shin, Seoul (KR); Jong Nam Lee, Hanam-si (KR)

(73) Assignee: Korea Advanced Institute Science and Technology, Taejun (KR)

( * ) Notice: Subject to any disclaimer, the term of this patent is extended or adjusted under 35 U.S.C. 154(b) by 0 days.

(21) Appl. No.: 09/309,253

(22) Filed: May 10, 1999

(30) Foreign Application Priority Data

May 8, 1998 (KR) .................................... 1998-0016460

(51) Int. Cl.[7] .............................................. H04B 10/08
(52) U.S. Cl. ..................... 359/110; 359/124; 359/173; 359/177; 359/179; 359/189; 359/195
(58) Field of Search ................ 359/110, 189, 359/195, 173, 177, 179, 124

(56) References Cited

U.S. PATENT DOCUMENTS 5,610,606 A * 3/1997 Fukunaga et al.
5,706,118 A * 1/1998 Takano
6,008,919 A * 12/1999 Watanabe
6,114,981 A * 9/2000 Nagata

* cited by examiner

Primary Examiner—Jason Chan
Assistant Examiner—Dzung Tran
(74) Attorney, Agent, or Firm—Akin Gump Strauss Hauer & Feld, L.L.P.

(57) ABSTRACT

The monitoring of the qualities of the optical signal transmitted from a light amplifying relay and nodes of transmission networks. An object of the present invention is to provide an apparatus and method for correct monitoring the qualities of the optical signal. While conventional methods monitor the qualities of the optical signal solely by the intensity of the optical signal, the present invention provides an apparatus and method for extracting the clock component of data from the optical signal transmitted and measuring the magnitude and then detecting the presence or absence of the signal and the error rate upon receiving the deteriorated signal due to the chromatic dispersion. The present invention comprises the simple measuring apparatus having a optical coupler 1, a signal conversion means 2, a narrow optical detector 3, a super high frequency rectifier 4 and a voltage detector 5. In application of management and maintenance of optical transmission systems using a light amplifier and photoelectric transmission networks, the present invention provides a high reliability in monitoring the qualities of the optical signal.

6 Claims, 4 Drawing Sheets

APPARATUS AND METHOD FOR MONITORING THE QUALITIES OF OPTICAL SIGNAL USING CLOCK AMPLITUDE

BACKGROUND OF THE INVENTION

1. Field of the Invention

The present invention relates to an apparatus and method for monitoring the qualities of optical signals in optical transmission systems or photoelectric transmission networks employing a light amplifier, and more specifically to an apparatus and method for monitoring the qualities of the optical signals using the amplitudes of clocks.

2. Description of the Conventional Art

The U.S. Pat. No. 5,654,816 entitled "Qualities monitoring and fault location in optical transmission" disclosed a technique for monitoring the qualities of optical signals for optical transmission systems. The U.S. Pat. No. 5,513,029 entitled "Method and apparatus for monitoring performance of optical transmission system" disclosed a technique for monitoring the performance of optical transmission system.

As light amplifiers capable of direct amplification of light are commercialized recently for optical transmission systems, transmission distance of optical transmission systems remarkably increases. Now, optical transmission systems whose relayless transmission distance amounts to several hundreds of kilometers are commercially available. Also, a number of studies have been performed on the photoelectric transmission networks, which achieve line distributions and branch connections without converting optical signals into electrical signals. This photoelectric transmission network is expected to be used as a major infrastructure of transmission networks in the forthcoming information superhighway era.

However, in order to utilize transmission systems efficiently, it should be noted that these systems are managed and maintained based upon the qualities of the optical signals carrying the information such as the optical signal intensity, the signal to noise ratio, and the error rate upon receiving the signal. Also, the reliability of communication needs to be assured.

In conventional optical communications that do not employ light amplifiers, the quality information of the optical signal needed for the management and maintenance of the systems can be correctly detected by converting optical signals into electrical signals at relay that relays the optical signal or at the receiving terminal of optical signals.

However, since systems using light amplifiers employ light amplifying relays instead of conventional electrical relays, light amplifying relays don't convert optical signals into electrical signals. Optical signals are not to be converted to electrical signals even in the nodes of the photoelectric transmission networks as well, and thus branch connections or line distributions are performed in the form of optical signals. Accordingly, the method capable of detecting the quality information of the optical signal needed for the management and maintenance of the systems or networks depends only upon the measurement of the signal to noise ratio of optical signals. Results of this measurement provide only smaller portion of the information than needed. For example, when optical signals do not carry any meaningful data, it is supposed to be determined as normal state by measuring only the intensity of optical signals, but communication fails in practice

SUMMARY OF THE INVENTION

The object of the present invention is providing an apparatus and method for monitoring the qualities of optical signals such as the presence or absence of the signals and the error rates upon receiving signals. It extracts clock components from the transmitted optical signals and measures magnitude of the clock amplitude in light transmission systems or photoelectric transmission networks.

To achieve this object, the monitoring apparatus according to the present invention is characterized by comprising:

an optical signal processing means for separating a portion of optical signals from the optical signals in transmitting through an optical fiber and converting the separated portion into signals having clock components;

a narrow optical detection means for converting the optical signal outputted from the optical signal processing means into electrical signals and then extracting only clock frequency components from the electrical signals to output the extracted components as sine waves;

a super high frequency (SHF) rectifying means for converting the output of the optical detection means into direct current (DC) signals;

a voltage detection means for measuring the magnitude of the direct current signals outputted from the SHF rectifying means; and a means for monitoring the qualities of the optical signal using the magnitude of the voltage, corresponding to the clock amplitude, outputted from said voltage detection means.

Also, the monitoring method according to the present invention is characterized by comprising the steps of:

separating a portion of an optical signal from the optical signal in transmitting through an optical fiber and converting the separated portion in to a signal having clock components;

converting the optical signals outputted in the separating step into electrical signals and then extracting only clock frequency components from the electrical signals to output the extracted components as sine waves;

converting the output of the converting the optical signals step into direct current (DC) signals;

measuring the magnitude of the direct current signals outputted in the converting the output step; and monitoring the presence or absence of data and the qualities of the optical signal including the bit error rates upon receiving the optical signals using the magnitude of voltage corresponding to the amplitude of the clock measured in the measuring step.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

The embodiments of the present invention will be explained with reference to the accompanying drawings.

Figure 1:
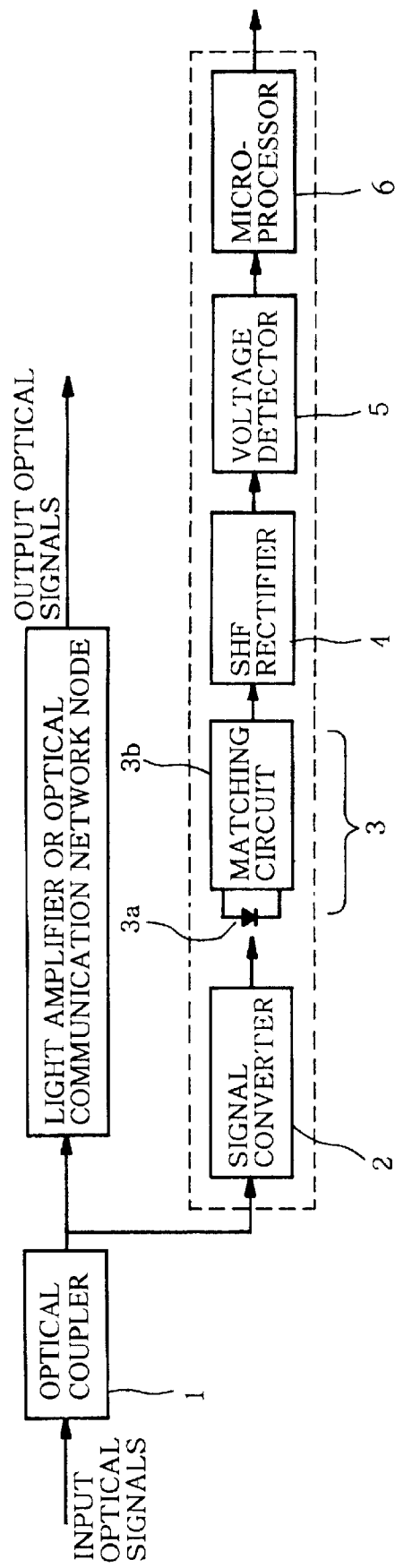
FIG. 1 is a block diagram illustrating an apparatus for monitoring the qualities of optical signals in accordance with the present invention.

FIG. 1 is a block diagram of an apparatus for monitoring the qualities of optical signal in accordance with the present invention.

As shown in FIG. 1, the apparatus for monitoring the qualities of optical signals in accordance with the present invention comprises an optical coupler 1, a signal converter (NRZ to PRZ) 2, a narrow optical detector having a resonance load 3, a SHF rectifier 4 and a voltage detector 5.

The optical coupler 1 separates a portion of the optical signal in transmitting through an optical fiber for measuring the optical signal. If the optical signal separated by the optical coupler 1 is NRZ signal mainly constituting the optical communication, the signal converter 2 converts the NRZ signal into a PRZ signal, because the NRZ signal is not provided with clock components. In case of the input optical signal being an RZ signal, the signal converter 2 is not needed. Accordingly, the narrow optical detector 3 is supplied with the PRZ signal passing through the signal converter 2 or the RZ signal not passing through the signal converter 2.

The narrow optical detector 3 is composed of a photoelectric transducer 3a and a matching circuit 3b. The photoelectric transducer 3a converts the PRZ signal or the RZ signal to electrical signal. The matching circuit 3b outputs the sine wave corresponding to the clock component of the input optical signal. Since the load of the optical detector is a resonance circuit that makes the resonance frequency thereof the clock frequency of the input optical signal, it extracts only the clock frequency components out of many frequency components present on the input optical signals. The outputted sine wave signal is amplified by a narrow amplifier, and then is converted to direct current (DC) by the SHF rectifier 4.

The voltage detector 5 measures the magnitude of DC voltage outputted from the SHF rectifier 4 to detect the quality information of the input optical signal.

After that, a processing means (not shown) such as microprocessor monitors the qualities of the optical signals using the magnitude of DC voltage outputted from the voltage detector 5.

The meanings of the measured output are as follows.

If input optical signal is not carrying any information, then the signal is not carrying the clock component. As a result, the value of the outputted DC voltage is "0". However, because only the magnitude of the input optical signal is measured in the conventional measurement methods, it is difficult to determine the presence or absence of the information on the input optical signal.

If the input optical signal is carrying any information, then the signal is carrying the clock component. As a result, the value of the outputted DC voltage is obtained. At this time, the outputted DC voltage is proportional to the square of the input optical signal intensity and is exponentially decreased as the pulse width carrying the information widens.

Figure 2:
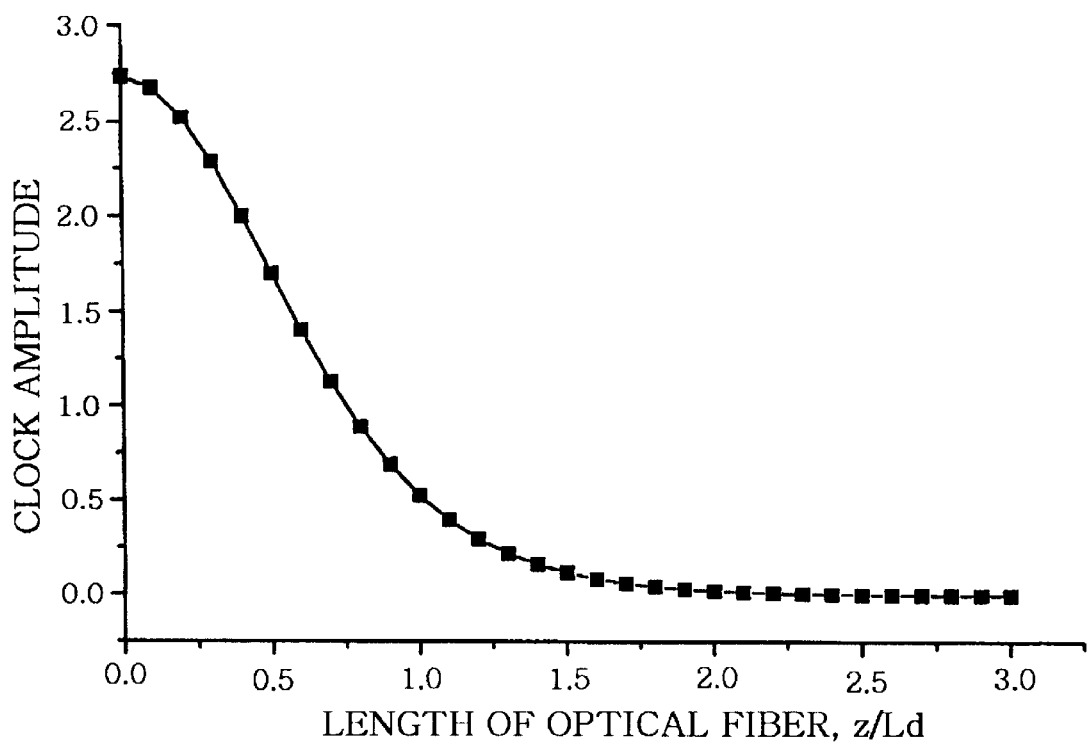
FIG. 2 is a graph illustrating the intensity of the clock signal to the length of optical fiber.

FIG. 2 is a graph illustrating the relationships between the intensity of clock signal and the length of optical fiber. It shows that the intensity of the clock signal is decreased because the pulse width gets widened due to the chromatic dispersion of the optical fiber.

Namely, the information about how much the pulse widths got widened due to the chromatic dispersion of the optical fiber is contained in the clock intensity. Accordingly, if the clock amplitude measured in the transmission side is compared with the clock amplitude measured in the light amplifying relay, it can detect as to how much the pulse widths got widened in process of being transmitted through the optical fiber. Also, if the clock amplitude measured in the reception side is compared with the clock amplitude measured in the light amplifying relay, detect the information on the signal error rate upon receiving the optical signal in the light amplifying relay can be measured.

Figure 3:
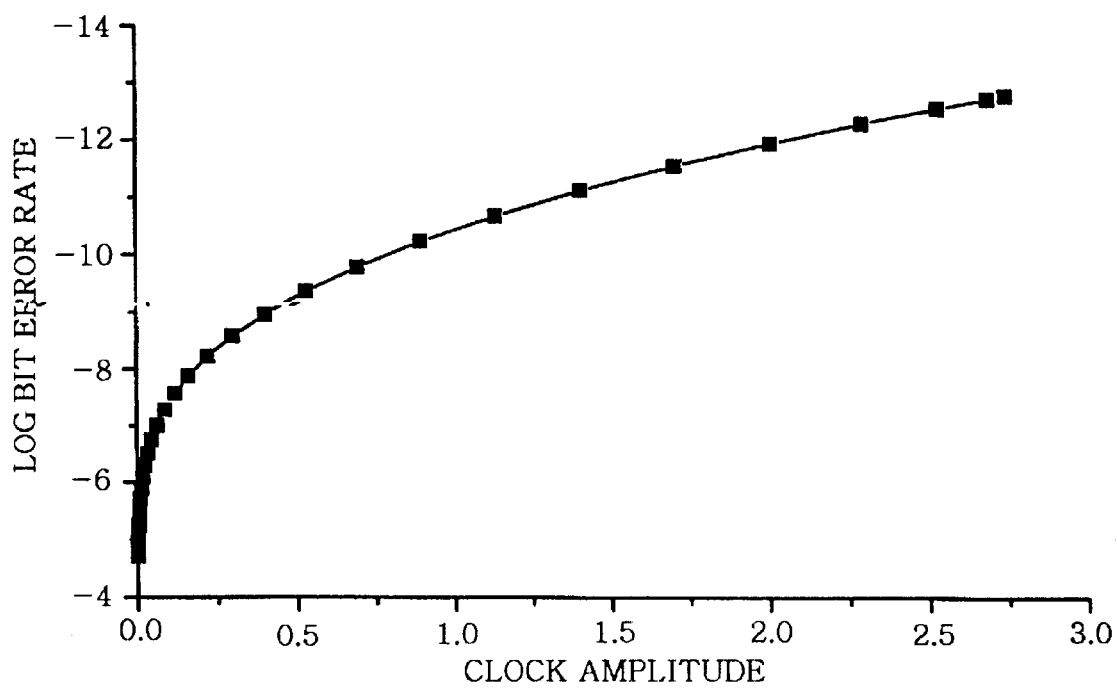
FIG. 3 is a graph illustrating the error rate of the received optical signal to the clock amplitude.

FIG. 3 is a graph illustrating the bit error rate of the received optical signal to the clock amplitude. As shown in FIG. 3, as the clock intensity decreases, the bit error rate of the received optical signal increases and the quality of communication being deteriorated.

Figure 4:
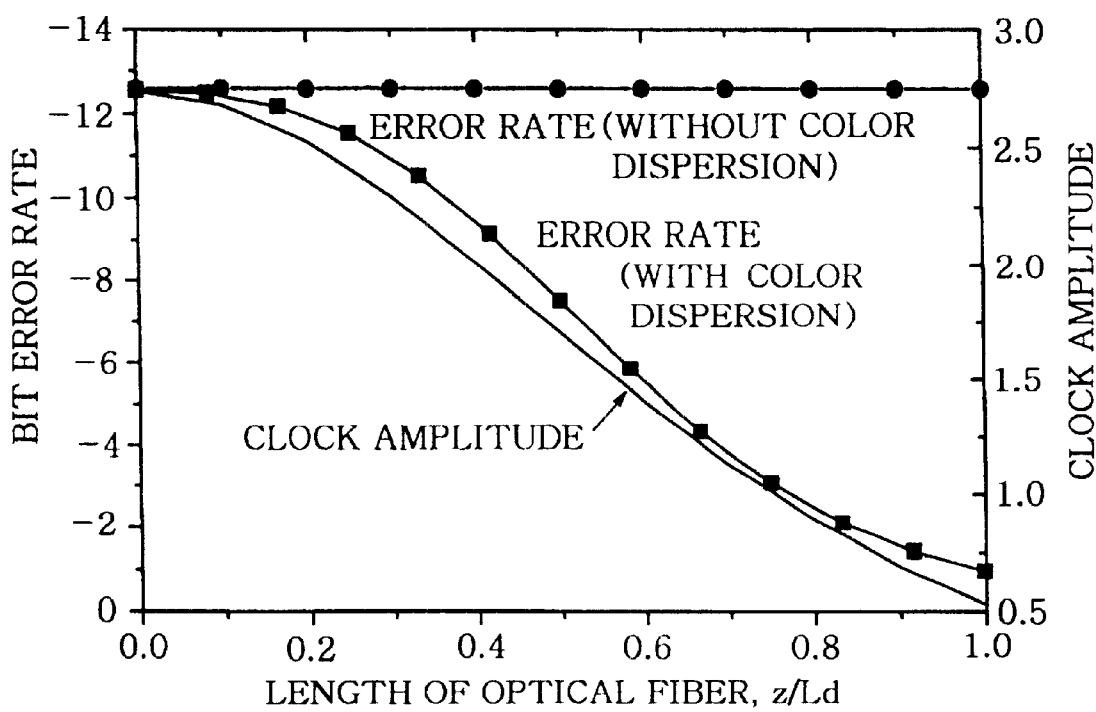
FIG. 4 is a graph illustrating the error rate to the transmission distance.

FIG. 4 is a graph illustrating the relationships of the bit error rate measured in the input optical signal with the same intensity to the transmission distance, the transmission speed of the input optical signal being assumed to 2.5 Gb/s.

In case of estimating the bit error rate only by the intensity of the input optical signal, it can be seen that the bit error rate uniformly exhibits regardless of transmitting distance of the input optical signal (the bit error rate without the chromatic dispersion of optical fiber). However, in practical systems, because the pulse widths get widened due to the chromatic dispersion of optical fiber, the bit error rate obtainable from the same light intensity increases as the transmission distance increases as shown in FIG. 4. If the bit error rate is compared with the intensity change of the clock amplitude to the transmission distance, it can be seen that the information on the change of the bit error rate to the transmission distance is contained in the clock amplitude.

In the conventional methods, the signal to noise ratio of the input optical signal is measured by using the average intensity of the input optical signal, and the qualities of the input optical signal is inferred by using the signal to noise ratio. However, as shown in FIG. 4, it is difficult to correctly determine the qualities of the transmitted optical signal only on the basis of the signal to noise ratio of the input optical signal measured by conventional methods. Namely, even if the signals have the same signal to noise ratio, there is a great deal of difference in signal error rate between the signal passing through the optical fiber and the signal not passing through the optical fiber.

In contrast, as proposed in the present invention, if the signal to noise ratio of the input optical signal is measured by using the clock intensity of the input optical signal, the qualities of the input optical signal can be correctly monitored since the information about the changes of pulse widths to the transmission through the optical fiber is to be known.

Accordingly, this invention has advantages, which are readily able to monitor the qualities of the input optical signal without complex processes, as compared to conventional methods. In conventional methods, input optical signal is converted to electrical signal and then the qualities of the input optical signal can be monitored by a variety of signal processing. Therefore, this invention has advantage in which the optical communications employing the light amplifier and the photoelectric transmission networks not only can be readily managed and maintained, but also the reliability of the optical communications can be improved.

Although the preferred embodiments of the present invention have been disclosed for illustrative purpose, those who are skilled in the art will appreciate that various modifications, additions and substitutions are possible without departing from the scope and spirit of the present invention as defined in the accompanying claims.

What is claimed is:

1. An apparatus for monitoring the qualities of an optical signal using a clock amplitude of the optical signal in optical transmission systems or photoelectric transmission networks, comprising:

an optical signal processing means for separating a portion of an optical signal from the optical signal in transmitting through an optical fiber and converting the separated portion into a signal having clock components;

a narrow optical detection means for converting the optical signal outputted from said optical signal processing means into electrical signals and then extracting only clock frequency components from the electrical signals to output the extracted components as sine waves;

a super high frequency (SHF) rectifying means for converting the output of said optical detection means into direct current (DC) signals; and a voltage detection means for measuring the magnitude of the direct current signals outputted from said SHF rectifying means; and a processing means for monitoring the qualities of the optical signals by using the magnitude of DC voltage outputted from said voltage detection means.

2. The apparatus according to claim 1, wherein said optical signal processing means includes:

means for separating a portion of an optical signal from the optical signal in transmitting through an optical fiber; and means for converting NRZ optical signals passed through said means for separating a portion of an optical signal into PRZ signals having clock components.

3. The apparatus according to claim 1, wherein said narrow optical detection means includes:

a photoelectric conversion means for converting the optical signals outputted from said optical signal processing means into electrical signals; and a matching means for outputting sine waves corresponding to the clock components of the signal outputted from said photoelectric conversion means.

4. A method for monitoring the qualities of an optical signal using a clock amplitude of the optical signal in a light amplifying relay and a transmission network node, comprising the steps for:

separating a portion of an optical signal from the optical signal in transmitting through an optical fiber and converting the separated portion into a signal having clock components;

converting the optical signal outputted in said separating a portion of an optical signal step into electrical signals and then extracting only clock frequency components from the electrical signals to output the extracted components as sine waves;

converting the output of said converting the optical signal step into direct current (DC) signals;

measuring the magnitude of the direct current signals outputted in said converting the output step; and monitoring the presence or absence of data and the qualities of the optical signal including the bit error rates upon receiving the optical signals using the magnitude of voltage corresponding to the amplitude of the clock measured in said measuring step.

5. The method according to claim 4, wherein the decision of the presence or absence of the data in said monitoring step is performed to determine the optical signal as an optical signal not carrying the data if the measured direct current value is less than the predetermined reference value.

6. The method according to claim 4, wherein the measurement of the signal qualities in said monitoring step is performed by comparing the measured amplitude of the clock signal with the clock amplitude or reference value in transmitter or receiver.

* * * * *